(12) United States Patent
Bliss et al.

(10) Patent No.: US 8,518,857 B2
(45) Date of Patent: Aug. 27, 2013

(54) CERAMIC STRUCTURES HAVING HYDROPHOBIC COATINGS

(75) Inventors: Max P. Bliss, Corning, NY (US); Dana C. Bookbinder, Corning, NY (US); Robert J. Paisley, Corning, NY (US); Christopher J. Warren, Waverly, NY (US)

(73) Assignee: Corning Incorporated, Corning, NY (US)

( * ) Notice: Subject to any disclaimer, the term of this patent is extended or adjusted under 35 U.S.C. 154(b) by 1852 days.

(21) Appl. No.: 11/015,714

(22) Filed: Dec. 16, 2004

(65) Prior Publication Data

US 2005/0159308 A1 Jul. 21, 2005

Related U.S. Application Data

(60) Provisional application No. 60/533,838, filed on Dec. 31, 2003.

(51) Int. Cl.
*B01J 35/00* (2006.01)
*B01J 35/02* (2006.01)
*B01J 35/04* (2006.01)
*B01J 35/10* (2006.01)
*B01J 33/00* (2006.01)

(52) U.S. Cl.
USPC ..................... 502/439; 502/527.19

(58) Field of Classification Search
USPC ............ 502/43, 439, 527.14, 527.15, 527.16, 502/527.19, 527.24; 428/117, 142, 325; 55/524

See application file for complete search history.

(56) References Cited

U.S. PATENT DOCUMENTS

| | | | |
|---|---|---|---|
| 3,873,350 A | 3/1975 | Dwyer et al. | 117/95 |
| 3,930,522 A | 1/1976 | Turner | 138/111 |
| 4,083,905 A * | 4/1978 | Insley et al. | 502/436 |
| 4,231,900 A | 11/1980 | Kato et al. | 252/466 PT |
| 4,399,052 A | 8/1983 | Sugino | 252/421 |
| 4,399,120 A * | 8/1983 | Cheung | 423/647.7 |
| 4,451,517 A | 5/1984 | Inoguchi et al. | |
| 4,483,940 A | 11/1984 | Ono et al. | |
| 4,529,718 A | 7/1985 | Dupin | 502/439 |
| 4,532,228 A | 7/1985 | Golino et al. | |

(Continued)

FOREIGN PATENT DOCUMENTS

| | | |
|---|---|---|
| EP | 0 554 104 | 1/2003 |
| JP | 56-133036 | * 10/1981 |

(Continued)

OTHER PUBLICATIONS

Garcia-Bordeje et al., "Preparation and characterisation aspects of carbon-coated monoliths," 2001, Catalysis Today, 69, pp. 357-363.*

(Continued)

*Primary Examiner* — Melvin C Mayes
*Assistant Examiner* — Colin W Slifka
(74) *Attorney, Agent, or Firm* — Matthew B. McNutt

(57) ABSTRACT

Provided is a catalyst support structure for use as either a NOx catalyst support or as a DPF having a hydrophobic coating. The hydrophobic coating affords a catalyst support structure exhibiting reduced or low absorption when exposed to both liquid catalytic coating or other aqueous media and thus protecting the catalyst support structure from cracking and spalling during drying. Methods are also provided for making a catalyst support structure with a hydrophobic coating.

14 Claims, 1 Drawing Sheet

(56) References Cited

U.S. PATENT DOCUMENTS

| | | | |
|---|---|---|---|
| 4,631,269 A | 12/1986 | Lachman et al. | 502/439 |
| 4,657,880 A | 4/1987 | Lachman et al. | 502/64 |
| 4,771,029 A | 9/1988 | Pereira et al. | 502/355 |
| 4,959,338 A | 9/1990 | Miura et al. | 502/263 |
| 5,346,722 A | 9/1994 | Beauseigneur et al. | |
| 5,750,026 A | 5/1998 | Gadkaree et al. | 210/502.1 |
| 5,820,967 A | 10/1998 | Gadkaree | 428/116 |
| 5,866,016 A | 2/1999 | Jaquess et al. | |
| 5,989,412 A * | 11/1999 | Okagami et al. | 208/251 H |
| 6,212,882 B1 * | 4/2001 | Greger et al. | 60/274 |
| 6,344,078 B1 | 2/2002 | Beall et al. | 106/285 |
| 6,541,407 B2 | 4/2003 | Beall et al. | |
| 6,602,449 B1 * | 8/2003 | Grader et al. | 264/43 |
| 6,610,628 B2 * | 8/2003 | Nordquist et al. | 502/159 |
| 7,132,150 B2 * | 11/2006 | Ogunwumi et al. | 428/117 |
| 7,344,770 B2 * | 3/2008 | Hirai et al. | 428/116 |
| 2003/0026944 A1 | 2/2003 | Kumazawa et al. | 428/116 |
| 2004/0070096 A1 * | 4/2004 | Grader et al. | 264/42 |

FOREIGN PATENT DOCUMENTS

| | | | |
|---|---|---|---|
| JP | 63-044938 | * | 2/1988 |
| JP | 2002166172 A | * | 6/2002 |
| JP | 2002-361083 | * | 12/2002 |
| JP | 2003-010626 | * | 1/2003 |

OTHER PUBLICATIONS

Valdes-Solis T et al., "Preparation of microporous carbon-ceramic cellular monoliths", Microporous and Mesoporous Materials, Elsevier Science Publishin, NY, vol. 43, No. 1, Mar. 2001, pp. 113-126.

Yan, Aihui et al., "Controlling water contact angle on carbon surfaces from 5° to 167°", Letters to the Editor / Carbon 44 (2006), pp. 3116-3120.

* cited by examiner

CERAMIC STRUCTURES HAVING HYDROPHOBIC COATINGS

This application claims the benefit of U.S. Provisional Application No. 60/533,838, filed Dec. 31, 2003, entitled "Cordierite Structures Having An External Hydroscopic Coating", by Max P. Bliss, et al.

BACKGROUND OF THE INVENTION

1. Field of the Invention

The invention relates to catalyst support structures having a passivated or hydrophobic layer, and particularly cordierite or aluminum titanate catalyst support structures/diesel filters having a hydrophobic external coating.

2. Discussion of the Related Art

Recently much interest has been directed towards the diesel engine due to its efficiency, durability and economical aspects. However, diesel emissions have come under attack both in the United States and Europe, for their harmful effects on the environment and on humans. As such, stricter environmental regulations will require diesel engines to be held to the same standards as gasoline engines. Therefore, diesel engine manufacturers and emission-control companies are working to achieve a diesel engine which is faster, cleaner and meets the most stringent of requirements under all operating conditions with minimal cost to the consumer.

Similarly to conventional engines, the exhaust gas discharged from diesel engines needs to be purified of nitrogen oxides (NOx). However, unlike conventional engines which simply employ three-way catalysts, the diesel engine, which is a partial lean burn gasoline engine producing exhaust gas with an excess amount of oxygen, cannot employ only three-way catalysts because in order for these types of catalysts to function properly they require conditions where the air-fuel ratio is substantially stoichiometric.

NOx traps appear to be a leading candidate for exhaust purification in diesel engines. NOx traps are similar to three-way catalysts, in that they are made of a catalyst support and a catalyst coating the support, with the difference existing in that NOx traps include an additional component in the catalyst coating which stores the trapped NOx. As the NOx-adsorbing component used in the NOx-adsorbing catalyst, there are known alkali metals such as K, Na, Li, Cs and the like; alkaline earth metals such as Ba, Ca and the like; and rare earth elements such as La, Y and the like.

NOx-adsorbing catalysts are generally formed by loading a catalyst layer containing the above-mentioned NOx-adsorbing component, on a monolithic catalyst carrier (monolith) composed of an oxide type ceramic (e.g. cordierite) or a metallic material (e.g. Fe—Cr—Al alloy). In the industry cordierite ($2MgO-2Al_2O_3-5SiO_2$) has been the cost-effective ceramic material of choice for NOx-carrier/supports for heavy duty vehicles due to its combination of excellent thermal shock resistance, filtration efficiency, and durability under most operating conditions. Recently, aluminum titanate-based ceramic materials have been gaining acceptance as another suitable NOx-carrier/support material.

Another significant challenge in lowering diesel emissions is controlling the levels of diesel particulate material present in the diesel exhaust stream. In 1998 diesel particulates were declared a toxic air contaminant by the California Air Resources Board. Legislation has been passed that regulates the concentration and particle size of diesel particulate pollution originating from both mobile and stationary sources.

Diesel particulate material is mainly carbon soot and one way of removing the carbon soot from the diesel exhaust is through diesel traps. The most widely used diesel trap is the cordierite ceramic diesel particulate filter (DPF) which filters the diesel exhaust by capturing the soot on the porous walls of the filter structure. The DPF is designed to provide for nearly complete filtration of soot without significantly hindering the exhaust flow and also, in some instances, like the NOx cordierite catalyst supports, includes a catalyst material; e.g., an oxidation catalyst. Again, aluminum titanate-based ceramic materials (AT) are finding applications as the DPF material.

Regardless of whether the cordierite or AT monolith is in the form of a catalyst carrier substrate or as a DPF, coldset ceramic cement (preferably cordierite) has long been used to form the exterior skin of the cordierite monolith. The coldset ceramic cement is mixed and applied to a fired, contoured substrate and the wet skin is afterwards allowed to dry either under ambient conditions or by convective or microwave drying at elevated temperatures. The substrate with exterior skin layer is then ready to receive a catalyst coating and any further downstream processing required.

As diesel filtration and catalyst products evolve and product performance demands change the catalyst coating process and chemistry, these changes are likely to result in incompatibilities between the catalyst coating process and the ceramic monoliths with exterior skin layers; whether in the form of NOx support substrates or in the form of DPFs. One example of an incompatibility between monolith with applied exterior skin layers and catalyst coating processes is that the monolith and/or skin can exhibit excessive skin or coating cracking or spalling during or following the subsequent catalyst coating steps, due to absorption of coating liquid by the skin. Other problems relating to monolith performance that have been observed following the application of catalyst coating media to ceramic monoliths include a substantial increase of the CTE (coefficient of thermal expansion) and/or increase of the elastic modulus of the monolith, both of these leading to decreased thermal shock performance (large axial and radial cracking) in the end use application. In addition, the catalyst coating can reduce the strength of the monolith. Catalyst coatings are well known in the art and can include compounds comprising cerium, platinum, rhodium, palladium, colloidal alumina, etc.

It would be considered an advance in the art to provide a ceramic monolith incorporating a coldset skinning cement that is impervious to a wide range of catalyst coating chemistries and associated processes, thus resulting in a reduction in the number of ceramic monolith product failures that occur as a result of incompatibility between substrate skin materials and the catalyst coating process. Another advance would be to provide a ceramic monolith wherein the catalyst coating does not substantially change the CTE, modulus, strength or thermal shock performance of the monolith.

SUMMARY OF THE INVENTION

The invention provides a catalyst support structure for use as either a NOx catalyst support or as a DPF. The catalyst support structure includes (i) a multicellular ceramic body, preferably a ceramic honeycomb, and more preferably a monolithic ceramic honeycomb made of cordierite or aluminum titanate, the ceramic honeycomb having an inlet end, an outlet end, and a multiplicity of mutually adjoining cells extending along the length of the honeycomb from the inlet end to the outlet end, the cells being separated from one another by porous walls, and, (ii) a hydrophobic coating adhering to the ceramic honeycomb which results in reduced absorption by the ceramic honeycomb when exposed to water-containing catalytic coating formulations and/or other aqueous media utilized in the process of applying the catalytic coating. In a preferred embodiment the hydrophobic coating is formed within or on an external skin portion of the ceramic honeycomb.

Another aspect of the invention is a method of producing a catalyst support structure, the method involving: (i) providing a multicellular ceramic body, preferably a ceramic honeycomb; (ii) applying to the ceramic body a coating comprised of a passivating material; (iii) drying the resulting coated multicellular ceramic body; and, (iv) optionally, heat-treating the dried coated multicellular ceramic body. Preferably, the drying process is carried out at a temperature range of less than about 200° C., i.e., at least for time sufficient to remove any excess solvent and to produce a hydrophobic coating on the multicellular ceramic body.

In two alternative embodiments, the passivating material can be incorporated in the following manner: (1) the liquid passivating material can be directly incorporated into a ceramic (preferably cordierite) cement with the mixture thereafter applied directly to the catalyst support, with the coated catalyst support thereafter being dried; and, (2) applying to an already applied ceramic skin coating (preferably, a cordierite cement coating) a liquid coating comprised of a passivating material and thereafter drying the applied passivating material.

DETAILED DESCRIPTION OF THE INVENTION

Figure 1:
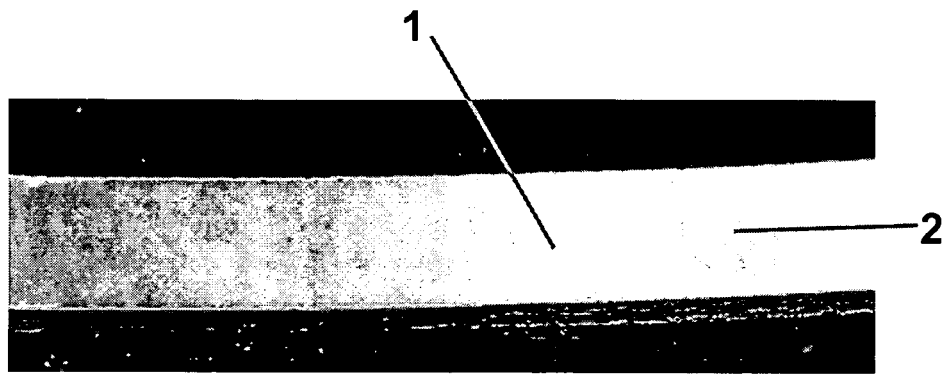
FIG. 1 is a photograph, illustrating the absorbing effect of water on a non-hydrophobic cordierite skin or coating.

The catalyst support structure of the present invention comprises a multicellular ceramic body, preferably a ceramic honeycomb. The honeycomb has an inlet end, an outlet end, and a multiplicity of mutually adjoining cells extending along the length of the body from the inlet end to the outlet end. The cells are separated from one another by porous walls. Typically, honeycomb cell densities range from 10 cells/in$^2$ (1.5 cells/cm$^2$) to 1200 cells/in$^2$ (188 cells/cm$^2$). Wall thickness typically range from 0.025 to 1.5 mm (1 to 60 ml), and preferably from 0.1 to 0.75 mm (4 to 30 ml). Wall pore size typically ranges between about 0.1 to 100 micrometers, preferably between about 1 to 40 micrometers, while wall porosity typically ranges between about 15-70%, preferably between about 25 to 50%.

Suitable ceramic honeycombs include monolithic honeycombs composed substantially of cordierite, an crystalline ceramic with an oxide composition close to that of $Mg_2Al_4Si_5O_{18}$; however, limited substitution of other constituents such as Fe (iron), Co (cobalt), Ni (nickel), and Mn (manganese) for the Mg (magnesium), Ga (gallium) for the Al (aluminum), and Ge (germanium) for the Si (silicon) is acceptable. Also, the cordierite phase may contain up to three atoms of an alkali (Group IA) metal, two atoms of an alkaline earth metal (Group IIA), or one atom of a rare earth metal (scandium, yttrium, or a lanthanide metal) per 54 oxygens.

These substituents would be expected to occupy the normally vacant "channel sites" in the crystal structure of the cordierite phase, although their limited substitution for Mg might also occur. Incorporation of these elements into the cordierite crystal structure may be coupled with other chemical substitutions, such as a change in Al to Si ratio, to preserve charge balance.

Multicellular bodies made of materials other than cordierite can also be used in the present invention. These materials include ceramic, glass, metal, clays, and the combination thereof. By combinations is meant physical or chemical combinations, e.g., mixtures, compounds, or composites. Other ceramics suitable for use as the ceramic body include ceramics such as silicon carbide, aluminum titanate and gamma alumina.

Ceramic honeycomb structures are made into a DPF in the following manner. A portion of the cells on the inlet end and a portion of the cells on the outlet end are plugged with the plugged portion of the cells at the inlet end being different from the plugged portion of the cells at the outlet end. Because of this configuration exhaust gases enter the ceramic honeycomb structure through open cells at the inlet end, flow through porous walls, and exit the honeycomb structure through open cells at the outlet end.

The multicellular ceramic bodies of the present invention (whether a monolith NOx catalyst support or a DPF) characteristically include hydrophobic surface coatings. The hydrophobic surface coatings will be present at least on external skin portions of the bodies (desirably as external coatings which cover the entire cylindrical exteriors of the bodies), and optionally also within the channel structures of the bodies. The hydrophobic coating is such that the resultant coated ceramic body exhibits low or reduced absorption when exposed to liquid catalytic coating media and any aqueous media utilized in the process of applying the catalytic coatings. Preferably, the hydrophobic coating results in a ceramic body which resists spalling or cracking as a result of exposure to the catalyzing process.

The aforementioned low or reduced absorption is achieved as a result of the non-wetting characteristic of the coated ceramic body which is achieved as a result of the incorporation of the hydrophobic coating. This non-wetting behavior is characterized in terms of the contact angle, which is defined as the angle formed at the interface between the liquid and the surface of the ceramic body when a liquid droplet is placed on the ceramic surface. More particularly, the contact angle is a quantitative measure of the wetting of a solid by a liquid and is defined geometrically as the angle formed by a liquid at the three phase boundary where a liquid, gas and solid intersect.

For the purposes of the present description, low absorption is defined as a non-wetting surface condition wherein a liquid (e.g. an aqueous catalyst coating mixture and/or any aqueous medium applied to the surface of the ceramic body in the course of applying such a coating) 'beads up' on that surface to a degree indicating that the surface is substantially non-wettable. A substantially non-wettable surface is considered to be a surface wherein a water droplet applied to that surface exhibits a contact angle higher than about 50° degrees. Low values of contact angle (<50°) indicate that the liquid spreads well, with a zero contact angle represents complete wetting. High values indicate less complete wetting or a non-wettable surface In accordance with the invention the above contact angle requirement of 50° or more can be met even for the case of a ceramic substrate or coating exhibiting approximately 50% porosity and a nominal/mean pore size of 10-20 μm.

Standard external coatings or skins are typically comprised of a ceramic material (preferably cordierite) and are made hydrophobic through the inclusion of a passivating material. There are numerous compounds that are hydrophobic in nature and can be blended with current skin batch ingredients to create a passivated or hydrophobic skin. Examples of suitable passivating materials which render the ceramic or cordierite coating or skin hydrophobic include the following: urethanes, silicones, silicone resin, silanes, oils, waxes, carbon, and carbon soot.

Utilizing cordierite as a representative ceramic skin material, the inclusion of the passivating material can be accomplished in one of three ways. The passivating material can be added and mixed into the standard cordierite coldset skin batch composition prior to the application of the cordierite coating or skin. In other words, in this method the passivating materials that will result in a hydrophobic skin, when dried, are added directly to the skin batch composition during the standard preparation of the skin material.

Alternatively, the passivating material can be applied in a post coating procedure directly to the cordierite skin portion which has previously been applied to a multicellular ceramic structure, and particularly in this case a liquid coating of the passivating material can be applied to the outer skin of a diesel filter or NOx catalyst support structure either by dipping, showering, spraying, rolling, blotting, injecting, etc with the resultant coating being either a thick film or glaze or it can be a thin, mono-layer.

Thirdly, the passivating material can be applied to the entire multicellular ceramic body by dipping the entire body in solution of the coating material.

In aforementioned embodiment of the present invention wherein the passivating material is added to the ceramic coating in a post-coating procedure so as to produce a coated catalyst support structure having a hydrophobic coating, the actual steps are as follows:

(a.) providing a fired multicellular ceramic body having an external ceramic skin coating;
(b.) applying to either the external skin coating or to the entire ceramic body substrate a coating comprising a passivating material;
(c.) drying the resulting coated ceramic body; and,
(d.) optionally heat treating the dried coated multicellular ceramic body at a temperature and for a time sufficient to produce a hydrophobic coating on the surface of the body.

In an alternative method, as briefly described above, the passivating material is added directly to the ceramic skin batch composition. The actual steps of producing a coated monolithic ceramic substrate having an external hydrophobic coating in this manner, are as follows:

(a.) providing a fired multicellular ceramic body;
(b.) applying to the external surface of the monolithic ceramic substrate a coating comprised of a ceramic cement having incorporated therein a passivating material;
(c.) drying the resulting coated multicellular ceramic body; and,
(d.) optionally, heat treating the dried coated multicellular ceramic body at a temperature and a time sufficient to produce a hydrophobic coating on the multicellular ceramic body.

In either method described above, the necessary drying time or temperature, so as to achieve the hydrophobic coating, will be easily determined by the skilled artisan. Preferably, the drying step for either method takes place at temperatures between about 60 to 450° C. for a time at least sufficient to remove the excess solvent from the body. An additional, optional heat-treating can be utilized and involved times and temperatures sufficient to crosslink the passivating material; like the drying step this preferably takes place at temperatures ranging from about 60 to 500° C., such as, for example, about 60 to 450° C. For example, in at least one embodiment, the optional heat-treating step may be carried out at a temperature of between about 60 to 500° C. or about 60 to 450° C. for 3 hours.

A preferred ceramic material for use in coating the monolithic ceramic substrate comprises a cordierite cold set skin composition having incorporated therein the passivating material; i.e., a cordierite/passivating material hydrophobic coating. In particular this composition comprises, in weigh percent: 50-65% ground cordierite, 0.1-1% methyl cellulose binder, 1-6% colloidal silica, 0-20% aluminosilicate fiber, 10-20% water, about 0.1-1% rheology modifier and about 1-6% of a passivating material selected from the group consisting of silicone resin, urethane, oil, silane, wax, carbon, carbon soot and mixtures thereof. In a preferred embodiment this cordierite skin/passivating material, hydrophobic coating composition comprises, in weight percent 50-60% ground cordierite, 0.1-1% methylcellulose binder, 3-5% colloidal silica, 13-20% aluminosilicate fiber, 18-20% water, 0.4-0.6% rheology modifier and 4-6% of the passivating material.

The inclusion of a hydrophobic ceramic skin or coating on the external surface of a multicellular ceramic body (in the form of either a NOx catalyst support or a DPF) wherein the passivated coldset skinning cement is impervious to catalyst coatings and the aqueous solutions utilized in catalytic coating process provides a number of advantages over the standard cordierite ceramic honeycombs having a non-hydrophobic cordierite skin. Most importantly, there is a reduction in the occurrences of skin cracking or spalling based on the fact that the passivated or hydrophobic skin does not allow intimate contact between the skin materials and the aqueous catalyst coating solution. In other words, any aqueous coating solutions that might be used in a catalyzing process will be repelled and prevented from being absorbed into the skin of the body, and thus any undesirable side effects that might result due to chemical or mechanical reactions or interactions between the applied skin and the catalyst coating solution or process are prevented.

An additional advantage is that the catalyst coating medium which is to be applied to the ceramic body is conserved, since the inventive passivated or hydrophobic skin coating will not unduly absorb the catalyst solution. Thus costly precious metals included in the catalyst coating medium will not be deposited on the skin layer where they would play no role in emission reduction.

EXAMPLES

To further illustrate the principles of the invention of the present invention, there will be described examples of the hydrophobic coating material according to the invention. However, it is to be understood that the examples are given for illustrative purpose only, and the invention is not limited thereto, but various modifications and changes may be made in the invention, without departing from the spirit of the invention.

Example 1

In one embodiment, as described above, the passivating material is incorporated directly into the standard cold set cordierite cement which itself can thereafter be applied to the substrate material. Reported in Table I is the standard skin composition (in wt. %) and the same standard skin composition (also in wt. %) that has incorporated therein a methyl phenyl silicone resin passivating material which renders the cordierite skin or coating hydrophobic.

TABLE I

| Standard Skin Composition | | Passivated Skin Composition | |
|---|---|---|---|
| Ground Cordierite (50/50 mixture of $d_{50}$ = 40 μm/ $d_{50}$ = 12 μm) | 62.5% | Ground Cordierite (50/50 mixture of $d_{50}$ = 40 μm/ $d_{50}$ = 12 μm) | 55.5% |
| Methylcellulose Binder (Dow Corning Methocel A4M) | 0.5% | Methylcellulose Binder (Dow Corning Methocel A4M) | 0.5% |
| Colloidal Silica (Ludox) | 4.0% | Colloidal Silica (Ludox) | 3.5% |
| Aluminosilicate fiber (Unifrax QF-180) | 17% | Aluminosilicate fiber (Unifrax QF-180) | 15% |
| Deionized Water | 16% | Deionized Water | 19.5% |
| | | Rheology modifier (Alcogum SL-70) | 0.5% |
| | | Silicone Resin Sol'n (Dow Corning DC233 silicone resin dissolved in dibasic ester of diethyl adipate, in a 2:1 distribution of particles ratio) | 5.5% |

Sample sheets comprised of each of the above compositions (standard skin and standard skin with incorporated passivating material) are produced in the following manner. The dry powder ingredients are first blended to form a dry powder mixture, to which the liquid components are then added. In both cases, the mixture was then mixed thoroughly using a standard Kitchen Aid mixer so as to form a slurry. The slurry was cast in Teflon mold and the sheets are thereafter dried to form the standard skin composition and standard plus passivating material-containing composition sheets, respectively; specifically, 20 mm×80 mm, 2 mm thick sheets are produced.

Figure 2:
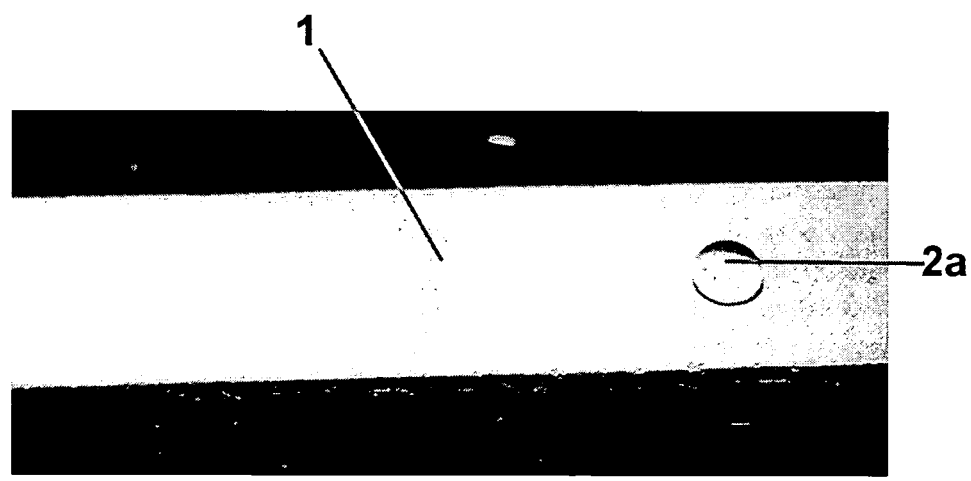
FIG. 2 is a photograph illustrating the non-absorbing effect of water on the inventive hydrophobic cordierite skin or coating.

For comparison purposes water drops are applied to each of the standard and passivating-containing material ceramic sheets. FIGS. 1 and 2 of the drawings are photographs illustrating the effect that the water has on each of the standard skin and the passivated, ceramic sheets, respectively. An examination of FIG. 1, the standard skin composition sheet sample reveals that the water 2 is not repelled and is, in fact, absorbed into the substrate surface 1. This is in direct contrast to the passivating-material-containing ceramic sheet, which includes the inventive hydrophobic surface, as illustrated in FIG. 2. An examination of the photograph of FIG. 2 reveals that the water 2a remains beaded on the surface of the sheet 1; i.e., low adsorption of the water occurs and a contact angle greater than 50° is observed.

Example 2

Four cordierite ceramic samples comprised of the standard cordierite skin composition detailed in Table I are produced; in particular 2 mm thick (100 mm×200 mm) sheets are formed. The first, for comparison, is not coated with a passivating material, while the other three sheets are coated with the inventive hydrophobic coatings. The passivating materials used for Inventive Samples A, B and C reported in Table II included, respectively, silicone resin (Dow Corning DC233 Silicone Resin dissolved in dibasic ester of diethyl adipate, in a 2:1 weight ratio), tung oil, and a copolymer consisting of Michem 4983R ethylene acrylic acid copolymer. For each of the inventive samples the passivating material is applied to the standard skin composition sheet (same wt % as above) by dipping the substrates for a time sufficient to saturate the sheets—approximately 1 min.

Each of the four substrate samples (one standard and three coated) are immersed in a cerium nitrate (CeNO3)3 catalyst solution for 4 hours (720 g/L cerium nitrate), then are allowed to dry at 60° C. overnight and then calcined at 500° C. for a time sufficient to convert the cerium nitrate to cerium oxide. The weight of the samples both before and after exposure to the catalyst solution is measured, with typical results being recorded in Table II. The "weight after" in Table II, being indicative of the amount of cerium nitrate absorbed, is measured along with the resulting material strength. Additionally, the bending modulus of rupture (MOR) in standard 4-point bending tests and measured in PSI) for the four samples, both before and after the exposure to the cerium nitrate solution, are measured and recorded in Table II.

TABLE II

| | % Wt. Gain After Exposure | MOR Before Exposure | MOR After Exposure |
|---|---|---|---|
| Comparison Sample: Standard Skin | 10.9 | 526.5 | 65.1 |
| Inventive Sample A | 4.5 | 432.1 | 427.5 |
| Inventive Sample B | 3.5 | 392.3 | 296.3 |
| Inventive Sample C | 5.4 | 602.1 | 477.5 |

An examination of the results of Table II reveals that the samples incorporating the inventive hydrophobic cordierite coating are relatively impervious to the catalytic solution and thus do not readily absorb the aqueous solution. That is, the percent of weight gain after exposure is less and the MOR strength is far greater in the inventive passivated, hydrophobic coating samples A, B, and C than is observed in the sample that includes the standard cordierite coating. The untreated non-hydrophobic sample retains only about 12% of its strength, whereas 99%, 75%, and 79% strength retention, respectively, is observed for the inventive samples. The comparison sample possessing a weakened skin or coating is quite susceptible to cracking, particularly if subjected to temperature fluctuations and thermal expansion coefficient mismatches between the skin and matrix material.

Example 3

Sixty two ceramic honeycomb samples are produced (31 comprising cordierite; 31 comprising aluminum titanate); each of the samples being comprised of an 8 mm×8 mm×50 mm bar cut from a ceramic honeycomb of corresponding composition. Each of 31 different passivating coating materials, as detailed in Table III, is applied to a cordierite honeycomb and aluminum titanate honeycomb bar. To apply these coating materials, each of the substrates is immersed in a room temperature dilute coating material solution for two minutes. The coating materials/passivation coating concentration utilized are detailed in Table III; 10% IPA representing a 10% isopropyl alcohol dilute solution, 10% $H_2O$ representing a 10% deionized water dilute solution and 100% representing a full strength material solution. The excess coating is then blown out of the samples using compressed nitrogen. The coated samples are then dried in a recirculating oven at 60° C. for a minimum of two hours.

The test used to measure the hydrophobic nature of the applied coating on the substrate is a contact angle measurement. Initial contact angle was measured on a VC2500XE goniometer, AST Products Inc., Billerica, Mass., using 2 μL deionized water drop. The corresponding contact angle for each of the cordierite and aluminum titanate substrates are reported in Table III.

TABLE III

| Sample No. | Coating Material | Concentration | Avg. initial contact angle degrees (Cordierite) | Avg. initial contact angle degrees (AlumTita) |
|---|---|---|---|---|
| 1 | Expoxidized Soybean Oil (DRAPEX ® 392) | 10% in IPA | 70 | 77 |
| 2 | Expoxidized Linseed Oil (VIKOFLEX ® 7190) | 10% in IPA | 73 | 68 |
| 3 | Methyl esters of tall oil fatty acids (SYLFAT ® MM) | 10% in IPA | 87 | 85 |
| 4 | Alkyltrialkoxysilane (TLF-8291) | 10% silane in $H_2O$ | 83 | 109 |
| 5 | Alkyltrialkoxysilane (TLF-8291) | 1.0 silane in $H_2O$ | 77 | 73 |
| 6 | Silane/siloxane concentrate (DOW CORNING ® Z-6689) | 10% in IPA | 115 | 114 |
| 7 | Palm Kernal Oil | 10% in IPA | 113 | 115 |
| 8 | Coconut Oil | 10% in IPA | 111 | 109 |
| 9 | Bis (2 ethylhexyl) sebacate (PLASTHALL ® DOS) | 10% in IPA | 52 | 64 |
| 10 | Carboxylic acids, polyol ester (PRIOLUBE ® 3986) | 10% in IPA | 99 | 107 |
| 11 | Caster oil | 10% in IPA | 75 | 69 |
| 12 | Unsaturated fatty acid dimer esters (UNIFLEX ® 102) | 10% in IPA | 91 | 80 |
| 13 | Glycol ester of fatty acid (UNIFLEX ® 206) | 10% in IPA | 84 | 85 |
| 14 | Linseed oil | 10% in IPA | 112 | 74 |
| 15 | Soybean oil | 10% in IPA | 87 | 100 |
| 16 | 1,1,1,3,3,3-Hexamethyldisilazane (HMDZ) | 100% | 120 | 139 |
| 17 | Expoxidized Soybean Oil | 100% | 84 | 71 |
| 18 | Expoxidized Linseed Oil (VIKOFLEX ® 7190) | 100% | 61 | 70 |
| 19 | Silane/siloxane emulsion (DOW CORNING ® 520) | 40% solids | 110 | 121 |
| 20 | Silane/siloxane concentrate (DOW CORNING ® Z-6689) | 100% | 127 | 125 |
| 21 | Pentaerythritol ester of C7-C10 fatty acids (HATCOL ® 5068) | 100% | 106 | 102 |
| 22 | Bis (2 ethylhexyl) sebacate (PLASTHALL ® DOS) | 100% | 69 | 62 |
| 23 | Epoxidized 2 ethylhexyl tallate (PLASTHALL ® S73) | 100% | 62 | 52 |
| 24 | Sorbitan Trioleate (SPAN ® 85) | 100% | 93 | 104 |
| 25 | Castor Oil | 100% | 71 | 68 |
| 26 | Unsaturated fatty acid dimer esters (UNIFLEX ® 206) | 100% | 64 | 68 |
| 27 | Glycol ester of fatty acid (UNIFLEX ® 206) | 100% | 76 | 76 |
| 28 | Soybean oil | 100% | 107 | 119 |
| 29 | Linseed oil | 100% | 93 | 100 |
| 30 | Oleic acid | 100% | 107 | 71 |
| 31 | No passivation coating |  | Immediately absorbed | Immediately absorbed |

An examination of Table III reveals that all of the coated samples (both cordierite and aluminum titanate) which included a passivating material exhibited contact angles of greater than 50° and thus exhibited a low adsorption of the aqueous medium of water. For comparison, one notes Example 31, which did not include a passivation coating and which immediately absorbed the 2 uL deionized water drop applied to its surface.

While the present invention has been described above with reference to certain preferred and specific embodiments thereof, those embodiments are illustrative only and are not intended to limit the invention insofar as it may be practiced within the scope of the appended claims.

We claim:

1. A catalyst support structure comprising a multicellular ceramic-body which includes:
   (i) an external skin portion,
   (ii) a hydrophobic coating, the hydrophobic coating resulting in a coated ceramic body exhibiting a low absorption of liquid catalytic coating mixtures and aqueous media utilized in application of the liquid catalytic coating mixtures, wherein the hydrophobic coating is formed directly on the external skin portion of the ceramic body, and
   (ii) a catalytic coating on the hydrophobic coating.

2. The catalyst support structure according to claim 1 wherein the coated ceramic body exhibits low adsorption such that a 2 μL deionized water drop exhibits a contact angle of greater than 50° when in contact with a surface of the coated ceramic body.

3. The catalyst support structure according to claim 1 wherein the hydrophobic coating is comprised of a passivating material containing cordierite cement.

4. The catalyst support structure according to claim 1 wherein the multicellular ceramic body is a monolithic ceramic honeycomb, having an inlet end, an outlet end, and a multiplicity of mutually adjoining cells extending along the length of the ceramic honeycomb from the inlet end to the outlet end, the cells being separated from one another by porous walls.

5. The catalyst support structure according to claim 4 wherein a portion of the cells on the inlet end and a portion of the cells on the outlet end are plugged, the plugged portion of the cells at the inlet end being different from the plugged portion of the cells at the outlet end, such that exhaust gases enter the ceramic honeycomb through open cells at the inlet end, flow through porous walls, and exit the ceramic honeycomb through open cells at the outlet end.

6. A catalyst support structure according to claim 4 wherein the monolithic ceramic honeycomb is comprised of material selected from the group consisting of cordierite, aluminum titanate, and mixtures thereof.

7. A catalyst support structure according to claim 6 wherein the cordierite or aluminum titanate ceramic honeycomb is further characterized by: a cell density of 10 to 1200 cells per square inch; a cell wall thickness of 0.1 to 50 mil; a cell wall porosity of 10% to 75% by volume; and, a cell wall median pore size of 1 to 50 micrometers.

8. A catalyst support structure according to claim 7 wherein the ceramic honeycomb is characterized by: a cell density of 100 to 600 cells per square inch; a cell wall thickness of 2 to 35 mil; a cell wall porosity of 25% to 65% by volume; and, a cell wall median pore size of 10 to 35 micrometers.

9. A method of producing a coated catalyst support structure having an external hydrophobic coating, the method comprising:
 a. providing a fired multicellular ceramic body;
 b. applying an external skin coating to the fired multicellular ceramic body;
 c. applying a hydrophobic passivating coating to the external skin coating and/or to the entire coated multicellular ceramic body;
 d. applying a catalyst coating to the coated multicellular ceramic body;
 e. drying the catalyst-coated multicellular ceramic body; and
 f. calcining the dried catalyst coated multicellular ceramic body.

10. The method of claim 9 wherein the multicellular ceramic body and the external skin coating are comprised of a cordierite material.

11. The method of claim 9 further comprising heat-treating the dried coated multicellular ceramic body of step e at a temperature of at least 60° C. for at least a time sufficient to crosslink the passivating coating material.

12. The method of claim 11 wherein the heat-treating step is carried out at a temperature of between about 60-500° C. for 3 hours.

13. The method of claim 9 wherein the hydrophobic passivating material is applied by dipping, showering, spraying, rolling, blotting or injecting.

14. The method of claim 9 wherein the hydrophobic passivating material is selected from the group consisting of silicone resin, urethane, oil, silane, wax, carbon, carbon soot and mixtures thereof.

\* \* \* \* \*